United States Patent [19]

Buss

[11] Patent Number: 5,224,438
[45] Date of Patent: Jul. 6, 1993

[54] DEVICE FOR REPELLING RODENTS

[75] Inventor: Melvin H. Buss, South Burlington, Vt.

[73] Assignee: Gardener's Supply Company, Burlington, Vt.

[21] Appl. No.: 856,672

[22] Filed: Mar. 24, 1992

[51] Int. Cl.⁵ .............................................. A01M 29/00
[52] U.S. Cl. ................................................... 116/22 A
[58] Field of Search ...................... 367/139; 116/22 A; 43/124

[56] References Cited

U.S. PATENT DOCUMENTS

| 3,093,761 | 6/1963 | Case | 116/22 A |
| 3,517,635 | 6/1970 | Kuhl et al. | 116/22 A |
| 4,366,562 | 12/1982 | McGinty | 116/22 A |

FOREIGN PATENT DOCUMENTS

| 383191 | 8/1990 | European Pat. Off. | |
| 2352987 | 4/1975 | Fed. Rep. of Germany | |
| 2267037 | 11/1975 | France | 116/22 A |
| 2581506 | 11/1986 | France | 116/22 A |

Primary Examiner—Ian J. Lobo
Attorney, Agent, or Firm—Wegner, Cantor, Mueller & Player

[57] ABSTRACT

A device for repelling rodents which burrow in the ground, such as moles and voles, involves a housing, an outer tube including a lower tubular portion for insertion in the ground, and an inner tube located inside the outer tube. The inner tube vibrates against the interior of the outer tube to produce audible vibrations. The device produces audible vibrations which impart sound waves and or physical vibrations to the ground in the vicinity of the device to repel rodents.

11 Claims, 3 Drawing Sheets

DEVICE FOR REPELLING RODENTS

The present invention relates to a device for repelling rodents which burrow in the ground such as moles and voles. The device produces audible vibrations which impart sound waves and or physical vibrations to the ground in the vicinity of the device to repel the rodents.

It is generally known that the transmission of sound waves or physical vibrations to the ground can repel burrowing rodents. Examples of vibratory devices for repelling rodents are disclosed in U.S. Pat. Nos. 3,093,761, 4,215,429 and 4,366,562.

The present invention provides a device which repels rodents. The device comprises a housing and an outer tube, wherein the lower portion of the outer tube extends below the bottom of the housing for insertion in the ground. An inner tube is provided inside the outer tube, and driving means imparts vibratory motion to the inner tube such that the inner tube vibrates against the outer tube. This vibratory action, resulting in repetitious contact of the two tubes, generates audible vibrations, and sound waves and or physical vibrations are transmitted to the ground in the vicinity of the device. The device produces vibrations of a relatively high intensity, and, accordingly, the device can protect a relatively large area from rodent infestation.

The upper end of the inner tube can be pivotally connected about a pivot axis such that the inner tube pivots about this axis. The driving means can comprise an electrical motor mounted at the lower end of the inner tube, wherein an eccentric weight is connected to the shaft of the motor. Rotation of the shaft with the eccentric weight thereon causes the inner tube to vibrate, i.e., to reciprocate about the pivot axis, and contact the outer tube. Since the inner tube only reciprocates about the pivot axis, wires running from the motor do not become twisted as can happen in vibratory devices where a motor is suspended from electrical wiring. Consequently, the device avoids potential problems at the electrical connection to the motor.

A timing circuit can be provided so that the motor is only operated at predetermined intervals since intermittent vibratory action is normally sufficient to repel rodents. This serves to prolong the life of the device and to reduce power requirements.

According to one preferred embodiment, the device can comprise a DC motor which is powered by batteries. A battery compartment is provided in the housing to hold standard alkaline batteries.

According to an alternate embodiment, the device can comprise a DC motor which is powered by solar energy by means of a photovoltaic panel on the exterior of the housing and rechargeable batteries. For this embodiment, a battery compartment is provided in the housing to hold the rechargeable batteries, such as nickel-cadmium batteries.

As apparent from FIG. 1, the device, shown generally as 1, comprises housing 2 and outer tube 3 which extends below the bottom of the housing, such that outer tube 3 can be inserted in a hole in the ground. A stake can be provided in conjunction with the device for boring holes having a diameter and depth of a desired size to receive outer tube 3. Preferably, the hole into which outer tube 3 is inserted is dug to a depth such that the bottom of housing 2 is positioned slightly above ground level when the lower portion of outer tube 3 is fully inserted in the hole. For example, the bottom of housing 2 should extend about 2 inches above ground level. End cap 10 can be provided to prevent dirt or other material from entering the interior of outer tube 3.

Figure 2:
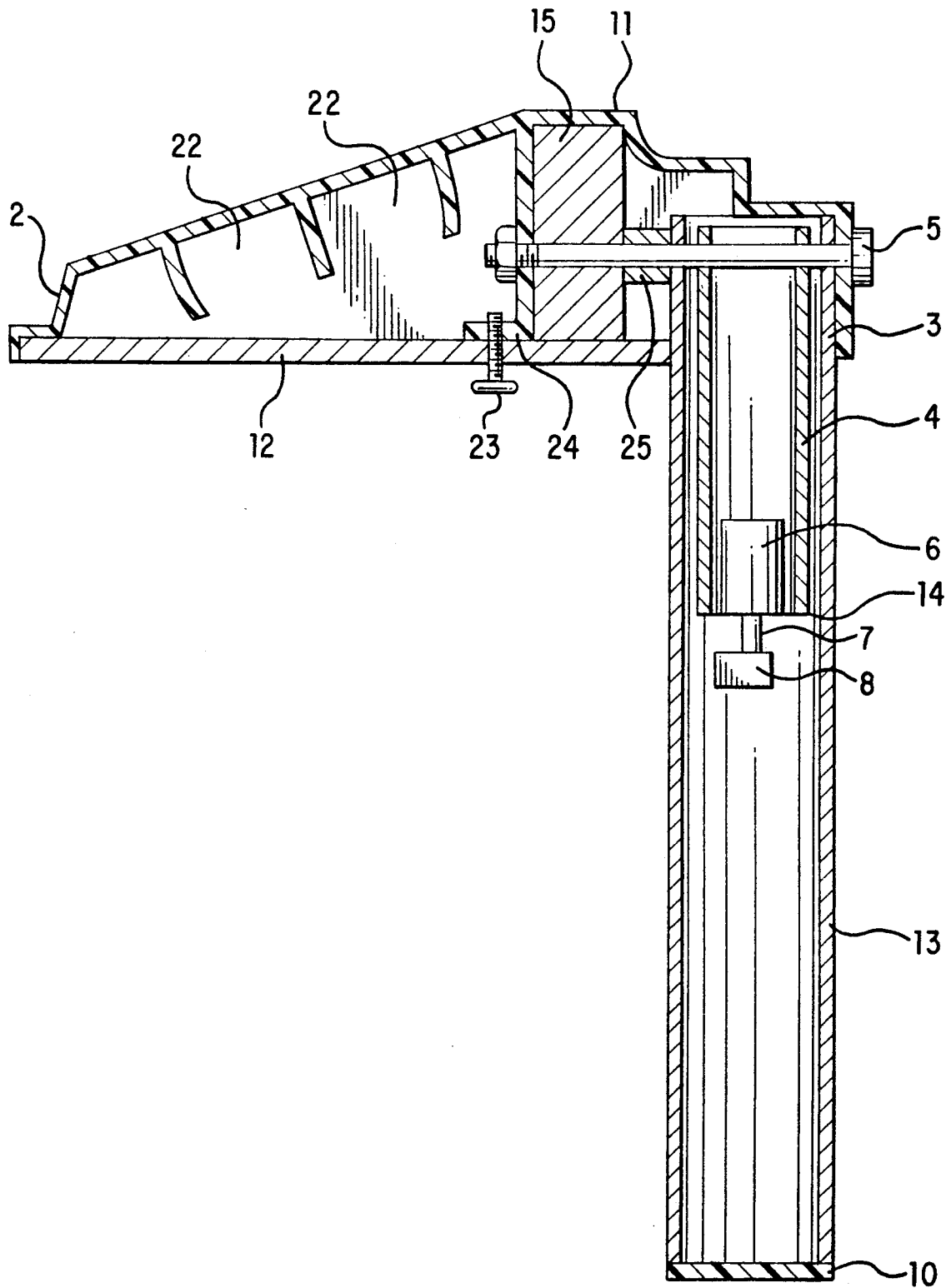
FIG. 2 is a schematic cross-sectional side view of a preferred embodiment of the device.

As seen more clearly in FIG. 2, housing 2 can comprise upper housing 11, which forms the top and sides of the housing, and base 12 which forms the bottom base of the housing. Preferably, both housing 11 and base 12 are weather resistant. Accordingly, housing 11 can be constructed of molded plastic and base 12 can be constructed of a stainless steel plate.

The upper portion of the outer tube is supported by the housing such that lower portion 13 extends below base 12. Inner tube 4 is positioned inside outer tube 3 in such a manner that inner tube 4 can be set in reciprocating motion to vibrate against the interior of outer tube 3. For the described embodiment, as shown in FIG. 2, inner tube 4 pivots about pivot axis 5 in such a manner that lower end 14 of the inner tube contacts the interior of outer tube 3 in a vibratory fashion. Pivot axis 5 can be provided by a pivot pin, as shown in FIG. 2, which is inserted through holes in the upper ends of both outer tube 3 and inner tube 4 such that inner tube 4 can freely pivot about the pivot pin. Whereas inner tube 4 can pivot about pivot axis 5, preferably, outer tube 3 is nested in the housing such that the outer tube does not move significantly about this axis.

As previously discussed, driving means imparts motion to inner tube 4 such that inner tube 4 pivots about pivot axis 5. For the described preferred embodiment, electrical motor 6 is mounted inside inner tube 4 near the lower end thereof. For example, motor 6 can be secured inside inner tube 4 by a set-screw (not shown). Eccentric weight 8 is mounted to shaft 7 of the motor. Accordingly, since movement of inner tube 4 is restricted to pivotal motion about pivot axis 5, rotation of the shaft with the eccentric weight thereon imparts the desired vibratory motion to inner tube 4. For example, the motor may be a 6-volt DC motor with a load current of 350 ma at 6100 rpm with a 20 g-cm load although any suitable type motor may be used.

Both the outer tube and the inner tube may be constructed of metal, such as aluminum. Metal-on-metal contact between the two tubes maximizes the audible sound waves and/or physical vibrations, and aluminum is resistant to weathering.

The outer tube should be long enough to support housing 2 above ground level and to provide sufficient area to contact the ground in which the outer tube is inserted. Preferably, lower portion 13 of the outer tube extends at least 6 inches below base 11. The inner tube should be long enough to provide sufficient distance between pivot axis 5 and the lower end 14 thereof. Accordingly, it is preferred that inner tube 4 is at least 2 inches long. Additionally, the gap between the outer diameter (OD) of inner tube 4 and the inner diameter (ID) of outer tube 3 needs to be large enough to allow inner tube 4 to pivot about its pivot axis 5. Preferably, this gap is at least 0.050 inches.

With these considerations in mind, one suitable combination of the inner tube and the outer tube for the illustrated preferred embodiment includes an aluminum outer tube about 10.5 inches long having an OD of about 1.38 inches and an ID of about 1.18 inches and an aluminum inner tube about 3.5 inches long having an OD of about 1.13 inches and an ID of about 0.92 inches.

In a preferred embodiment, timing circuit 15 is connected to motor 6 so that motor 6 is operated at predetermined intervals. For example, timing circuit 12 can engage the motor for 4 seconds every 200 seconds, and for the described embodiment, a 4-7 volt DC timing circuit can be employed.

Figure 1:
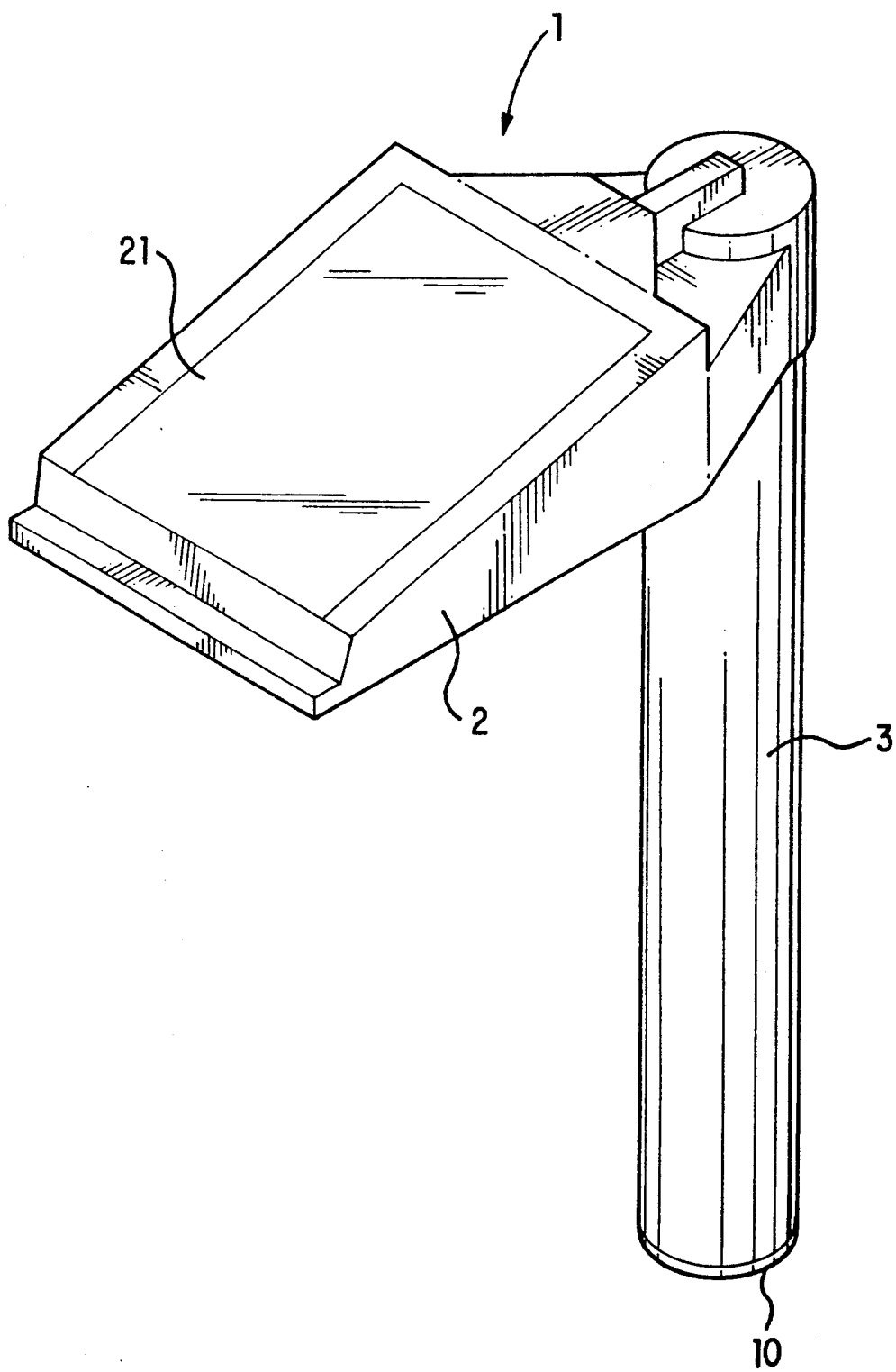
FIG. 1 is a schematic perspective view of the device according to a preferred embodiment.
Figure 3:
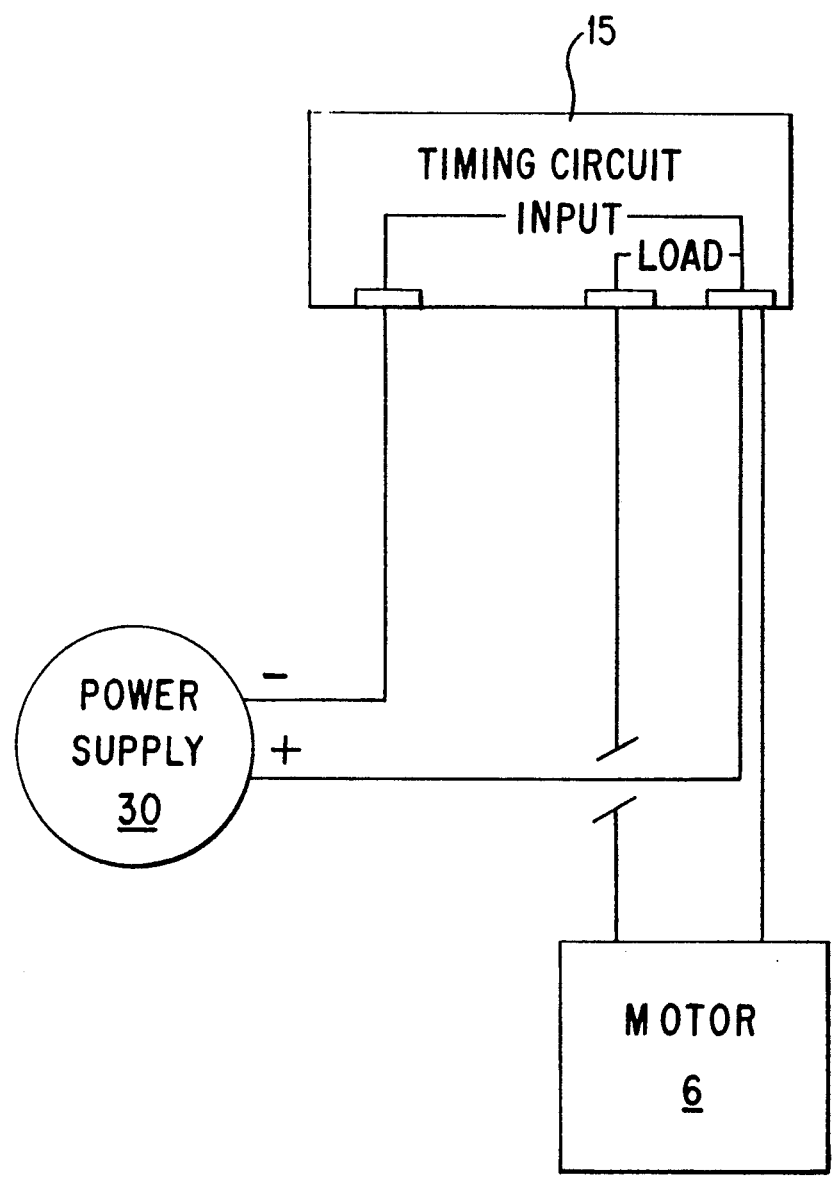
FIG. 3 is a schematic wiring diagram according to a preferred embodiment.

As shown in FIG. 1, the device can be provided with photovoltaic panel 21 mounted on housing 12 to supply power to the driving means. For this embodiment, battery compartment 22 is provided to hold rechargeable batteries, e.g., four "C" size nickel-cadmium batteries. Alternately, the device can be powered by standard alkaline batteries, e.g., four "C" size alkaline batteries, held in compartment 22. Of course, for this latter embodiment, no photovoltaic panel is necessary, as illustrated in FIG. 2. A wiring diagram is shown in FIG. 3, wherein the power supply is shown generally as 30.

Access to battery compartment 22 can be achieved by employing a removable base. For example, as illustrated in FIG. 2, base 12 is provided with pin 23 which is removably engagable with a hole provided in bracket 24.

For the described embodiment, the pin forming pivot axis 5 also assists in securing bracket 24 and timing circuit 15 to housing 11. Accordingly, sleeve 25 can be provided between timing circuit 15 and outer tube 3.

The wiring which connects timing circuit 15 to motor 6 can be inserted through the open upper end of inner tube 4. Since the inner tube, with the motor mounted therein, only reciprocates about the pivot axis, wires running from the motor do not become twisted.

Although the invention has been described in detail with particular reference to preferred embodiments thereof, it will be understood that variations and modifications can be effected within the spirit and scope of the invention.

I claim:

1. A device for repelling rodents comprising: a housing comprising a bottom, a top and sides;
an outer tube supported by said housing which comprises a lower tubular portion extending below the bottom of said housing for insertion in the ground;
an inner tube comprising a lower tubular portion extending below the bottom of said housing, wherein the lower tubular portion is located inside said outer tube; and
driving means for imparting vibratory motion to said inner tube such that said inner tube vibrates against said outer tube to produce audible vibrations.

2. The device of claim 1, wherein an upper end of said inner tube is pivotally connected about a pivot axis such that the lower end of said inner tube vibrates against the interior of said outer tube during operation of said driving means.

3. The device of claim 2, wherein said inner tube is located entirely inside said outer tube, the upper end of said inner tube pivotally connected about said pivot axis at an upper end of said outer tube.

4. The device of claim 2, wherein said driving means comprises an electrical motor mounted in the lower end of the inner tube and an eccentric weight connected to a shaft of the motor, wherein rotation of the shaft with the eccentric weight thereon imparts vibratory motion to said inner tube about the pivot axis.

5. The device of claim 4, further comprising a timing circuit connected to said electrical motor for operating the electrical motor at predetermined intervals.

6. The device of claim 4, further comprising a battery chamber in said housing adapted to hold alkaline batteries for supplying power to said driving means.

7. The device of claim 4, further comprising a photovoltaic panel on the top of said housing for converting solar energy to electrical energy and a battery chamber in said housing adapted to hold rechargeable batteries for supplying power to said driving means.

8. The device of claim 1, wherein the outer tube is at least 8 inches long and the inner tube is at least 2 inches long.

9. The device of claim 8, wherein the lower tubular portion of said outer tube extends at least 6 inches below the bottom of said housing.

10. The device of claim 1, wherein the outer tube and the inner tube are metallic.

11. The device of claim 9, wherein the outer tube and the inner tube are aluminum.

* * * * *